United States Patent
Ljung et al.

(10) Patent No.: US 11,997,596 B2
(45) Date of Patent: May 28, 2024

(54) COMMUNICATION DEVICE AND METHOD FOR TRANSMITTING DATA

(71) Applicant: Sony Mobile Communications Inc., Tokyo (JP)

(72) Inventors: Rickard Ljung, Helsingborg (SE); Eduard Popkov, Lund (SE); Vanja Plicanic Samuelsson, Lund (SE); Henrik Sundstrom, Södra Sandby (SE)

(73) Assignee: Sony Group Corporation, Tokyo (JP)

( * ) Notice: Subject to any disclaimer, the term of this patent is extended or adjusted under 35 U.S.C. 154(b) by 523 days.

(21) Appl. No.: 16/098,597

(22) PCT Filed: May 13, 2016

(86) PCT No.: PCT/EP2016/060849
§ 371 (c)(1),
(2) Date: Nov. 2, 2018

(87) PCT Pub. No.: WO2017/194158
PCT Pub. Date: Nov. 16, 2017

(65) Prior Publication Data
US 2021/0243691 A1    Aug. 5, 2021

(51) Int. Cl.
*H04W 52/02* (2009.01)
*H04W 76/27* (2018.01)
*H04W 76/28* (2018.01)

(52) U.S. Cl.
CPC ... *H04W 52/0216* (2013.01); *H04W 52/0251* (2013.01); *H04W 76/27* (2018.02); *H04W 76/28* (2018.02)

(58) Field of Classification Search
CPC ......... H04W 52/0216; H04W 52/0251; H04W 76/28; H04W 76/27; Y02D 30/70
See application file for complete search history.

(56) References Cited

U.S. PATENT DOCUMENTS

| | | | |
|---|---|---|---|
| 2010/0091758 A1* | 4/2010 | Goteti | H04W 72/1268 370/345 |
| 2012/0120815 A1* | 5/2012 | Anderson | H04W 76/28 370/252 |

(Continued)

FOREIGN PATENT DOCUMENTS

| CN | 101557275 A | 10/2009 |
|---|---|---|
| CN | 102187726 A | 10/2009 |

(Continued)

OTHER PUBLICATIONS

3GPP TSG RAN WG2 Meeting #93bis; R2-162277, Source: Huawei, China Telecom, HiSilicon, Title: RAN initiated paging optimization in light connection, Dubrovnik, Croatia, Apr. 11-15, 2016. (Year: 2016).*

(Continued)

*Primary Examiner* — Mohammed S Chowdhury
(74) *Attorney, Agent, or Firm* — Tucker Ellis LLP

(57) ABSTRACT

The present invention relates to a communication device and to a method each of them being configured to: divide data to be transmitted into at least one data portion; and transmit each data portion during a time, at which the device is to be activated for executing a pre-determined activity, wherein the pre-determined activity comprises at least one corresponding data and/or signal communication and wherein the transmission of the data portion refers to a further activity of the communication device that is different from the pre-determined activity.

17 Claims, 6 Drawing Sheets

(56) References Cited

U.S. PATENT DOCUMENTS

| | | | |
|---|---|---|---|
| 2013/0225068 A1* | 8/2013 | Kiminki | H04W 52/028 455/39 |
| 2015/0319001 A1* | 11/2015 | Kojima | H04W 52/0216 370/254 |
| 2016/0029417 A1 | 1/2016 | Vannithamby et al. | |
| 2016/0057797 A1* | 2/2016 | Bangolae | H04L 43/16 370/311 |
| 2016/0227481 A1* | 8/2016 | Au | H04W 52/0209 |
| 2016/0295634 A1* | 10/2016 | Miao | H04L 41/0681 |

FOREIGN PATENT DOCUMENTS

| | | |
|---|---|---|
| CN | 102113264 A | 6/2011 |
| CN | 103986566 A | 8/2014 |
| CN | 105122672 A | 12/2015 |

OTHER PUBLICATIONS

3GPP TSG RAN WG2 Meeting #93bis; R2-162278, Source: Huawei, China Telecom, HiSilicon, Title: General aspects for light connection, Dubrovnik, Croatia, Apr. 11-15, 2016. (Year: 2016).*

International Search Report and Written Opinion from counterpart International Patent Application No. PCT/EP2016/060849, dated Jan. 26, 2017, 12 pages.

Office Action for corresponding European Application No. 16722670.3, dated Aug. 18, 2021. 6 pages.

Chinese Office Action dated May 14, 2021 for Application Serial No. 201680085624.5 (6 pages).

Chinese Office Action dated Nov. 16, 2020 for Application Serial No. 201680085624.5 (6 pages).

International Preliminary Report on Patentability dated Nov. 13, 2018 for Application Serial No. PCT/EP2016/060849 (8 pages).

* cited by examiner

COMMUNICATION DEVICE AND METHOD FOR TRANSMITTING DATA

TECHNICAL FIELD

The present invention relates to a communication device and to a method arranged to execute data transmissions. The communication device may be a user communication device or a communication network device. The present invention relates also to a correspondingly arranged computer program product and to a correspondingly arranged computer-readable recording medium.

BACKGROUND

In standardization of communication systems such as wideband code division multiple access (WCDMA) and/or long term evolution (LTE), the main focus has been often directed to the question of how to optimize the radio link communication for relatively large data communication sessions. Typical examples of such use cases are file upload, file download, e-mail transmission, e-mail reception, web browsing etc.

Nowadays, machine to machine (M2M) applications become more important. The development of M2M applications refers, for example, to machine-type communication (MTC) and/or narrow band internet of things (NB-IOT). M2M applications are, in particular, implemented among and/or with regard to a large amount of devices that are capable of communicating (transmitting and/or receiving data/signals) via communication networks such as LTE. Frequently, such devices require only small data or small data packet transmissions respectively. Said transmissions of small data or small data packets respectively comprise, for example, sensor data transmissions and/or command transmissions. Because the small data transmissions may be executed frequently and/or because each transmission requires some wake-up/set-up/activation time and because it is expected that on top of that the modem, i.e. the receiver and/or transmitter of the device is also regularly activated for other modem related activities not specifically coupled to the mentioned data transmission, the total power consumption increases with each small data transmission. Thus, battery lifetime is of great importance. In some cases, the priority of handling battery lifetime becomes even higher than the priority of handling short data transmission latency.

To prolong the battery lifetime, one type of devices could essentially refrain from listening to paging events and utilize power save mode (PSM). This type of devices could be, for example, in dormant state between own initiated transmissions and/or control signal transmissions initiated by the device itself, said transmission comprising, e.g., tracking area update messages. Another type of devices could rely service wise on a pre-defined pattern of reoccurring occasions, i.e. events in the device and/or activities of the device when the device should activate its modem and conduct channel measurements and/or listen to possible control signal to be notified about downlink data between own data/signal transmission events. In some systems such as WCDMA and LTE this can be referred to as paging occasions. In the following, focus is set on the latter type of devices, i.e. on devices that are configured to activate functions of its modem at pre-defined occasions to receive control signalling and/or measure radio channel properties of the received signal energy, and/or be able to detect possible notification signalling (here denoted as executing paging) into which the device may be notified about possible reception of downlink data. The first type of devices are also applicable in the following, while however the pre-defined reoccurring occasions of modem activity are less frequent in time.

In general, approaches for small data transmissions are required that do not strain battery lifetime in devices. In particular, approaches are desired that, despite the execution of small data transmissions, improve battery lifetime prolongation in devices.

SUMMARY

The present invention enables execution of data transmissions, in particular, of small data transmissions with improved battery lifetime. Thus, if a communication device has to execute one or more data transmissions and on top of that also has to regularly activate the modem for other modem related activities, not specifically coupled to the mentioned one or more data transmissions, the negative effect of said transmissions on the battery lifetime will be significantly reduced. By the present invention, the battery or energy consumption in a communication device is saved despite the large amount of small data transmissions.

The general idea of the present invention is to use times pre-determined for executing a pre-determined activity, said pre-determined activity comprising data and/or signal communication (i.e. transmission and/or reception), to execute at least one small data transmission. With regard to the pre-determined activity, the communication device is expected to measure radio channel properties, to listen to control signaling such as system signaling, and/or to execute at least one data and/or signal communication that belongs to the pre-determined activity. The radio channel property measurements, the control signal listening and/or the data and/or signal communication(s) consume battery energy. If no data and/or signal communication that belongs to the pre-determined activity is executed or said communication does not require the whole time as pre-determined, the battery energy is nevertheless consumed because radio channel property measurements and/or the control signal listening are nevertheless executed with regard to the pre-determined activity. If however a data transmission would occur at the time of the pre-determined activity the pre-determined activity may not be required to be executed to its full extent, or at all. The present invention suggests to use the time pre-determined for execution of the corresponding pre-determined activity for one or more small data transmissions, either in addition or instead of parts of or the complete pre-determined activity. The small data transmission(s) are executed at said pre-determined time at time points, at which the data and/or signal communication belonging to the pre-determined activity if possible could be reused or omitted. As one example, a paging event is/could be considered as a pre-determined activity and consists/could consist of channel measurements for time and frequency synchronization, as well as listening to broadcasted control channel for possible paging. If the device uses the pre-determined time for paging activity to instead initialize a small data transmission, the time and frequency measurements may be done as part of the data transmission activity, while specific paging activity can be omitted. Thus, the small data transmission(s) may initiate the radio channel property measurement(s) and/or the control signal listening(s) expected to be executed with regard to the pre-determined activity and the pre-determined activity does not require "own" radio channel property measurement(s) and/or the control signal listening(s). In this way, energy, which would have been required for radio channel property measurement(s) and/or the control signal listening(s) with regard to the predetermined activity, can be saved. Alternatively, in some embodiments, the times required for setting and for releasing connections for the small data transmission(s) can be saved, because said connections are already set and released with regard to the pre-determined activity. This improves battery lifetime prolongation in devices.

Usually, the pre-determined activities are repeated, i.e. are repetitive events, communication schedule of the communication device will always have a further future time pre-determined periods for execution of the pre-determined activities. Thus, the communication device has repeatedly the opportunity to transmit further small data during re-occurring modem (i.e. transmitter and/or receiver) activity times. This accumulates the energy savings.

Herein, the term "small data" refers to or specifies data, size of which is equal or below a threshold. Also for considering small data the number of reoccurring or repeated data transmissions required for transmitting portions of the data, obtained by dividing the data into data portions, over time may be limited to a corresponding threshold. Thus, data (to be transmitted) is considered as representing "small data" if size of the data is smaller than or equal a data size threshold and/or if the data can be divided into a number of data portions for reoccurring or repeated data transmissions that is smaller than or equal a data portion number threshold.

The present invention refers at least to communication device, method, computer program product and computer program product as specified in independent claims, the further arrangements of which are exemplary specified in dependent claims as well as in the following description and attached figures.

The present invention relates to a communication device configured to: divide data to be transmitted into at least one data portion; and transmit each data portion during a time, at which the device is or is (expected) to be activated for executing a pre-determined activity, wherein the pre-determined activity comprises at least one (corresponding) data and/or signal communication and wherein the transmission of the data portion refers to a further activity of the communication device that is different from the pre-determined activity. According to an embodiment, at said time, the device activates itself for executing the pre-determined activity.

The term "pre-determined activity" represents an activity that has been determined and/or set as being appropriate for permitting small data transmissions during the time, at which the device is or is to be activated for executing a pre-determined activity. According to an embodiment, the pre-determined activity may refer to one particular activity such as paging only. According to a further embodiment, the pre-determined activity refers to one particular activity including but not limiting to: obtaining time or frequency synchronization, conducting an update signaling, conducting a control signal measurement, conducting a radio channel property measurement, conducting a discovery signal detection or transmission. According to an embodiment, the pre-determined activity represents a set of activities that have been determined and/or set as being appropriate for permitting small data transmissions during the time, at which the device is or is to be activated for executing a pre-determined activity. The set of activities comprises at least one of the activities mentioned exemplary here and/or at least one further appropriate activity.

According to an embodiment of the present invention, the pre-determined activity comprises or refers to at least one activity that is a reoccurring or repeated activity, i.e. activity that is executed again and again. Further, the time, at which the pre-determined activity is a pre-determined and/or pre-set time. The time may be pre-determined and/or pre-set by a corresponding scheduling. Thus, if the pre-determined activity is or comprises at least one reoccurring or repeated activity, a plurality of times or time periods will be given, at which the pre-determined activity will be correspondingly executed.

The term "communication" refers to or comprises at least one data and/or signal transmission and/or at least one data and/or signal reception.

According to an embodiment, the communication device is further configured to: transmit a first data portion at said time; and transmit a second data portion at a further time, at which the device is expected to be activated for executing a pre-determined activity. According to an embodiment, at said further time, the device activates itself for executing the pre-determined activity.

According to an embodiment, said time and/or said further time represent a time period, at which the communication device is activated after being in a low activity mode which, according to an embodiment, is but is not limited to: a dormant mode; an idle mode; a sleep mode; a power saving mode; a hibernating mode; and/or a standby mode or any other power saving mode.

According to an embodiment, the communication device is configured to: execute an examination of said data to be transmitted; and/or determine whether the data to be transmitted is appropriate to be transmitted during the time, at which the device is expected to be activated for executing a pre-determined activity.

According to an embodiment, said examination comprises: a data size examination, in which the communication device is configured to examine whether the data to be transmitted has a data size that is smaller than or equal a data size threshold; and/or a data portion number examination, in which the communication device is configured to examine whether a number of the data portions that would be obtained when dividing the data to be transmitted into at least one portion is smaller than or equal a data portion number threshold.

According to an embodiment, the communication devices is configured to determine that the data to be transmitted is appropriate to be transmitted during the time, at which the device is activated for executing a pre-determined activity if: the data size of the data to be transmitted is smaller than or equal the data size threshold; and/or the number of the data portions that would be obtained when dividing the data to be transmitted into at least one portion is smaller than or equal a data portion number threshold.

According to an embodiment, the communication device is configured to execute the dividing of the data to be transmitted into at least one data portion and the transmitting of each data portion if the data to be transmitted is appropriate to be transmitted during the time, at which the device is activated for executing a pre-determined activity; and/or the communication device is configured to execute said examination for each entry of a transmission buffer According to an embodiment, the communication device is configured to: initiate the transmission of each data portion at a time, at which the communication device itself is expecting to execute the pre-determined activity; and/or execute the transmission of each data portion during a time, at which the communication device is executing parts of or the whole pre-determined activity.

According to an embodiment, each data portion has a size that is equal or smaller than a maximum size; and/or the communication device is configured to determine the maximum size.

According to an embodiment, the communication device is configured to determine the maximum size by use of at least one of the following: energy required for transmission of a data of a preset size; time required for connection setup for data communication and/or time required for connection release; average data throughput expected for a data transmission; average current consumption consumed with regard to connection setup for data communication, operating in an active state, and/or connection release; time required for the communicating of data; and/or average current consumed for the communicating data.

According to an embodiment, the communication device is configured to transmit each data portion via a light connection.

According to an embodiment, if at least two data portions are obtained by dividing data to be transmitted into at least one data portion, the communication device is configured to maintain a connection, established and/or used for a transmission of a first data portion of the at least two data portions, and to re-use said connecting for a transmission of a further data portion of the at least two data portions.

According to an embodiment, the pre-determined activity comprises at least one of the following: a paging activity; a radio channel measurement activity; a tracking area update activity; a routing area update activity; a synchronization activity (e.g., for time and/or frequency synchronization); a location area update activity; a pilot signal transmission activity; a pilot signal reception activity; device-to-device discovery signal reception; a device-to-device discovery signal transmission; and/or a system information reception activity.

Further, the present invention relates to a method comprising the steps of: dividing data to be transmitted by a communication device into at least one data portion; and transmitting each data portion during a time, at which the communication device is or is to be activated for executing a pre-determined activity, wherein the pre-determined activity comprises at least one corresponding data and/or signal communication and wherein the transmission of the data portion refers to a further activity of the communication device that is different from the pre-determined activity. In general, the method is executed by a communication device as indicated above and as explained in more detail in the following. Thus, the method comprises in general steps that are executed by the communication device and that are described herein.

The present invention refers also to a computer program product comprising computer readable program code that is configured to cause a computing device to execute steps of the method as introduced above and as described in more detail below. According to an embodiment, the computer readable program code is embodied in a computer-readable medium. According to a further embodiment, the computer-readable medium is a non-transitory computer-readable medium. According to an embodiment, the computing device is a processor or any other computer configured to execute computer readable program code.

Moreover, the present invention refers also to a computer-readable recording medium configured to store therein the above-introduced computer program product. According to an embodiment, the computer-readable medium is a non-transitory computer-readable medium.

It has to be noted that, while some embodiments are described in the context of particular communication networks and/or communication protocols, the techniques disclosed herein may also be correspondingly employed for other network techniques, i.e. communication networks and/or communication protocols.

BRIEF DESCRIPTION OF THE DRAWINGS

In the following, embodiments of the present invention are described with reference to accompanying drawings in which the same or similar reference numerals designate the same or similar elements.

DETAILED DESCRIPTION OF EMBODIMENTS

In the following, exemplary embodiments of the present invention are described with reference to the attached drawings. Features of the various embodiments may be combined with each other unless specifically stated otherwise.

Figure 1:
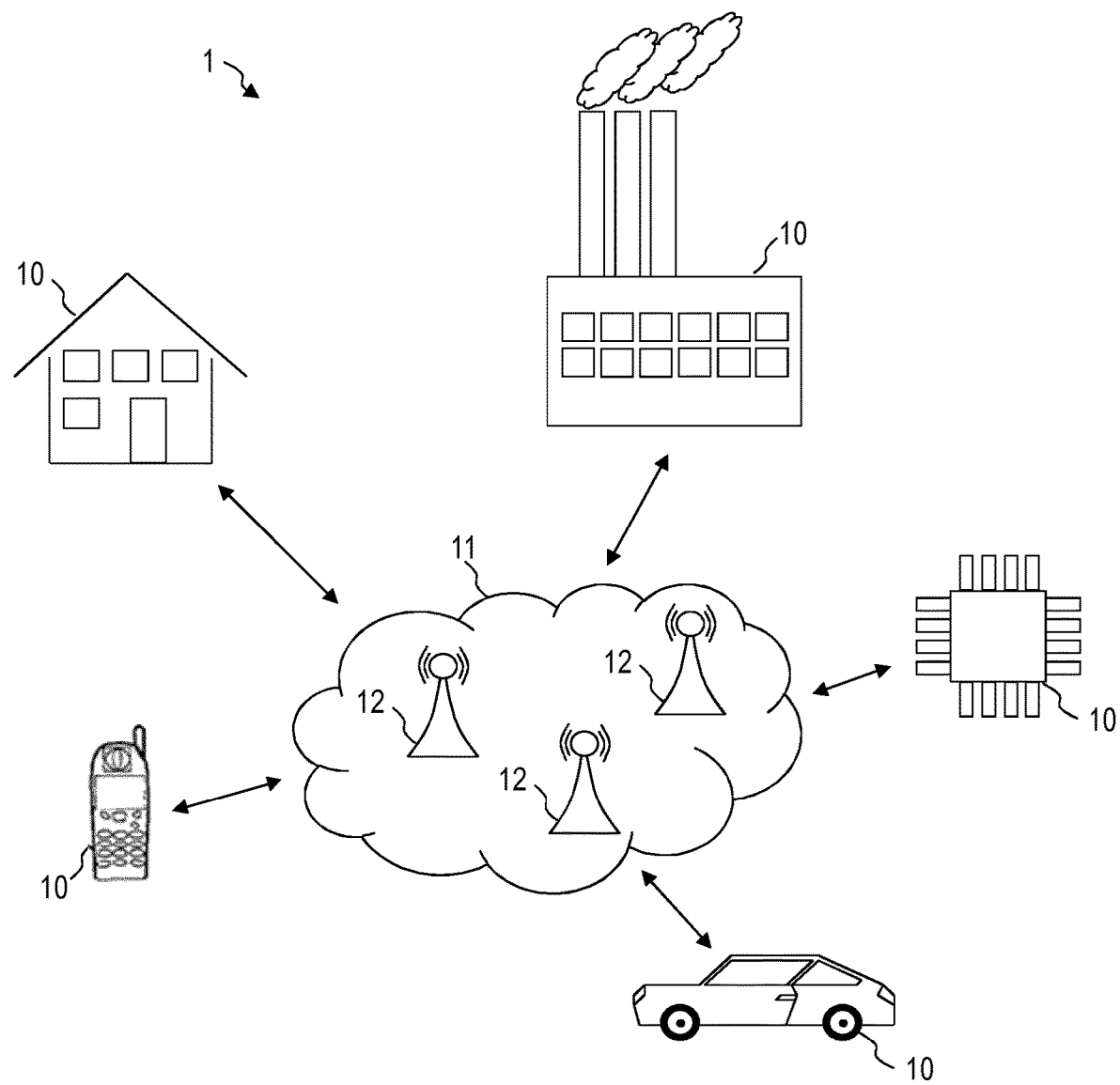
FIG. 1 is a schematic view of a network, in which the present invention is implemented according to an embodiment of the present invention.

FIG. 1 is a schematic view of a network 1, in which the present invention is implemented according to an embodiment. The network 1 comprises a plurality of communication devices 10, 12, capable of communicating, i.e. of executing transmissions and/or receptions of signals and/or data. According to the present embodiment, the communication between the communication devices 10, 12 is a wireless communication. Thus, wireless data/signal transmissions and/or receipts are executed. Further, according to the present embodiment, the communication is executed according to at least one communication protocol, which may refer, for example, to WCDMA, LTE etc. Moreover, according to the present embodiment, two kinds of communication devices 10, 12 are distinguished in general. The one kind of communication devices has the reference number 10 and is referred to as a user communication device. User communication devices 10 comprise, for example: mobile devices such as laptops, mobile phones, vehicles etc.; machine-type devices such as home automation devices, smart meters etc.; and/or any other kind of devices that may be incorporated in M2M applications. The other kind of communication devices has the reference number 12 and is referred to as communication network device. Communication network devices 12 comprise, for example, base stations, eNodeBs or eNBs, and/or access points etc. In general, a communication network device 12 is configured to enable a user communication device 10 to communicate via a communication network 11. Communication network 11 is implemented according to at least one communication protocol such as WCDMA, LTE etc. User communication devices 10 are connected to at least one communication network 11 that is implemented via at least one communication network device 12. The communication between two user communication devices 10 comprises uplink and downlink transmissions. An uplink transmission is a signal/data transmission from a user communication device 10 to a communication network device 12. A downlink transmission is a signal/data transmission from a communication network device 12 to a user communication device 10. If a user communication device 10 transmits a signal/data to another user communication device 10, the transmission is executed via at least one communication network device 12 or between the two communication devices 10 directly as a device-to-device (D2D) communication.

Figure 2:
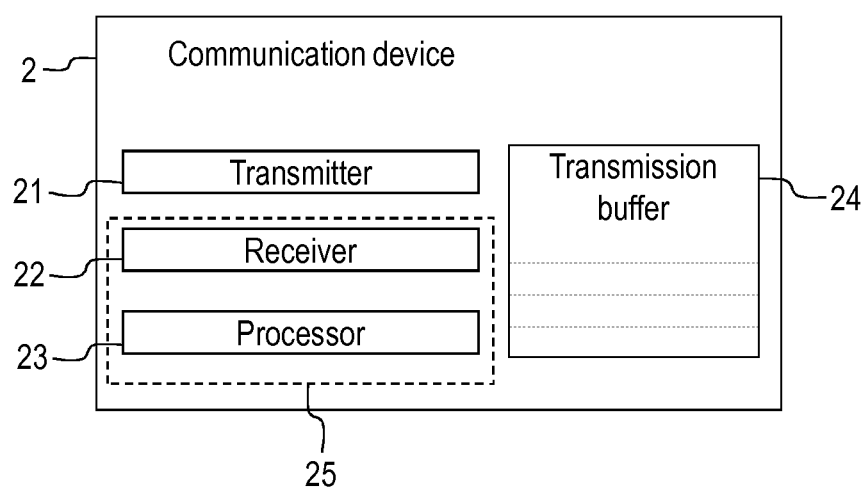
FIG. 2 is a block diagram of a communication device according to an embodiment of the present invention.

FIG. 2 is a block diagram of a communication device 2 according to an embodiment of the present invention. According to a further embodiment, communication device 2 is a communication network device 12. According to another embodiment, communication device 2 is a user communication device 10. Communication device 2 of FIG. 2 comprises a transmitter 21 that is configured to execute signal/data transmissions. In particular, transmitter 21 is configured to execute any of signal/data transmissions described here. Further, communication device 2 of FIG. 2 comprises a receiver that is configured to execute signal/data receptions. In particular, receiver 22 is configured to execute any of signal/data receptions described here. Transmitter 21 and receiver 22 are arranged according to an embodiment as separate units. According to another embodiment, transmitter 21 and receiver 22 are provided within one unit 25 such as a transceiver or modem, for example. Said unit 25 is indicated in FIG. 2 by dashed lines around transmitter 21 and receiver 22. The unit 25 comprising transmitter 21 and receiver 22 can be arranged as an internal or as an external unit of communication device 2.

Communication device 2 of FIG. 2 comprises further a processor 23 that is configured to perform any of the steps executed by communication device 2, apart from the transmissions executed by transmitter 21 and apart from the receptions executed by receiver 22. In particular, processor 23 is arranged to execute steps described here with regard to communication device 2 (i.e. user communication device 10 or communication network device 12), i.e. steps of said communication device 2, 10, 12.

Processor 23 and transmitter 21 are configured to exchange data or information respectively. In particular, processor 23 provides signals/data/information to be transmitted, i.e. to be sent to transmitter 21. Further, also processor 23 and receiver 22 are configured to exchange data or information respectively. In particular, receiver 22 provides received signals/data/information to processor 23 for further processing by processor 23.

According to FIG. 2, communication device 2 comprises a transmission buffer 24. In transmission buffer 24 data/information to be transmitted is stored until the transmission of the data/information has been executed. Transmission buffer 24 comprises a plurality of entries, each entry comprising corresponding data to be transmitted by transmitter 21. Thus, according to the present embodiment, processor 23 provides signals/data/information to be transmitted to transmitter 21 via transmission buffer 24. The signals/data/information to be transmitted are provided by processor 23 to transmission buffer 24 that stores each signal/data/information to be transmitted in a corresponding entry. Transmitter 21 takes then each signal/data/information from transmission buffer 24 and transmits it to the corresponding receiving device. After the transmission, the corresponding signal/data/information is deleted from transmission buffer 24.

Figure 3:
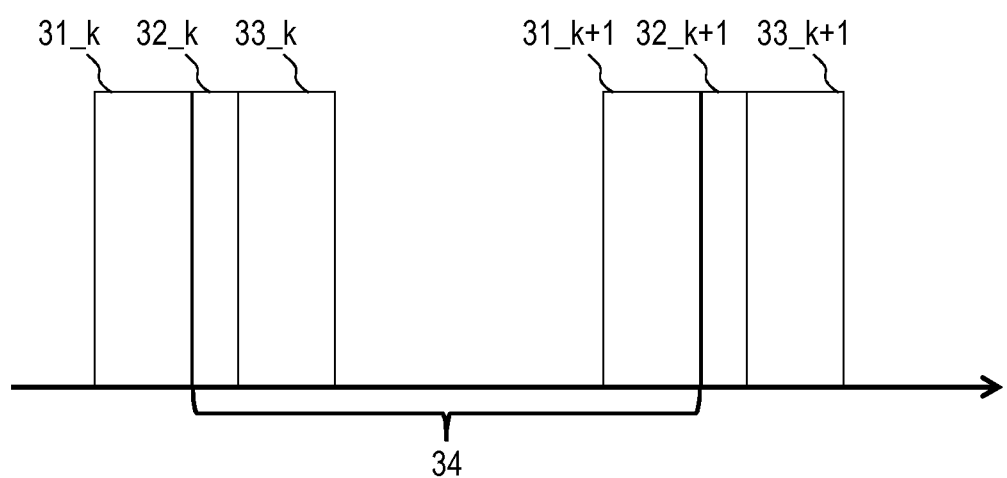
FIG. 3 shows communicating of signals and/or data with regard to a pre-determined activity according to an embodiment of the present invention.

FIG. 3 shows communicating of signals and/or data with regard to a pre-determined activity according to an embodiment of the present invention. The communicating is a part of the pre-determined activity. The pre-determined activity is executed at a time that is pre-determined for the execution of the pre-determined activity. E.g., the time is pre-determined according or by a schedule. According to the embodiment, if a communication device 2, 10, 12 is communicating signals and/or data, the communicating is done with a repetitive pattern. In particular, the communication device 2, 10, 12 is arranged to repeat the execution of the pre-determined activity at particular, i.e. predetermined times. For example, this repetition is pre-determined by a schedule. The schedule is, for example, a schedule of the communication device 2, 10, 12. Thus, also the communicating of signals and/or data is repeated at the particular or pre-determined times because the communicating is a part of the pre-determined activity.

As mentioned, the pre-determined activity comprises, for example, at least one of the following: a paging activity; a radio channel measurement activity; a tracking area update activity; a routing area update activity; a synchronization activity (e.g., for time and/or frequency synchronization); a location area update activity; a pilot signal transmission activity; a pilot signal reception activity; a device-to-device discovery signal reception; a device-to-device discovery signal transmission; a system information transmission; and/or a system information reception activity. The pre-determined activity is, however, not limited by the above mentioned examples. Rather, it may comprise further activities, which comprise or involve signal and/or data communications and which are executed at times pre-determined for execution of said activities. According to a further embodiment, the pre-determined activity is repeated. In particular, it is repeated at further pre-determined times.

As to the operation of communication device 2, 10, 12 with regard to the communicating, communication device 2, 10, 12 is activated for the execution of the pre-determined activity and, thus, for the execution of the communicating. If the pre-determined activity is repeated again and again, communication device 2, 10, 12 becomes active with a repetitive pattern for the execution of the pre-determined activity and, thus, for the execution of the communicating. After the execution of the pre-determined activity comprising the execution of said communicating, the communication device 2, 10, 12 can switch to dormant mode, idle mode, sleep mode, power saving mode, and/or standby mode until the next activation.

In FIG. 3, reference number 34 indicates a time interval between two communications. The arrow of FIG. 3 indicates a time line. The first or left communication is executed as a part of the pre-determined activity within a time pre-determined for execution of the pre-determined activity. The subsequent or right communication is executed within a time pre-determined for a repeated execution of the pre-determined activity.

The operating of communication device 2, 10, 12 with regard to the pre-determined activity and, particularly, with regard to the execution of communication part of the pre-determined activity comprises in general three steps. These steps are repeatedly executed with regard to the times predetermined for the repetitive execution of the pre-determined activity.

In a first step 31_$k$, 31_$k$+1 ($k≥1$ and being natural), a wake up activity is executed, if the communication device 2, 10, 12 is not in an active mode. For example, the communication device 2, 10, 12 is in dormant mode, idle mode, sleep mode, power saving mode, and/or standby mode. In particular, in the first step 31_$k$, 31_$k$+1, the pre-determined activity is started. Here, a connection set-up for the execution of the communication of the pre-determined activity (e.g., for at least one reception and/or for at least one transmission of data and/or signal(s)) is executed, for example. According to an embodiment, it comprises start-up of processes in base band, radio frequency system synchronization or re-synchronization etc.

In a second step 32_$k$, 32_$k$+1, communication device 2, 10, 12 is in an active state and ready or prepared for communicating data and/or signal(s). Thus, in the second step 32_$k$, 32_$k$+1, communication device 2, 10, 12 receives and/or transmits at least data and/or signal. If no data and no signal to be communicated within the pre-determined activity is present, no communicating is executed despite the availability of the connection set-up or arranged in first step 31_$k$, 31_$k$+1.

In a third step 33_$k$, 33_$k$+1, communication device 2, 10, 12 executes post communication activities in view of expiry of the time pre-determined for the execution of the pre-determined activity. For example, communication device 2, 10, 12 decodes received information and/or signals, executes channel estimation updates etc.

After the execution of third step 33_$k$, 33_$k$+1 and, in particular, if the time pre-determined for the execution of the pre-determined activity has expired, according to an embodiment, the communication device 2, 10, 12 switches to dormant mode, idle mode, sleep mode, power saving mode, and/or standby mode until the next activation.

According to a further exemplary embodiment, the pre-determined activity is paging. Communication network 11 is, for example, LTE, and paging is executed as specified 30 according to corresponding LTE standards. According to this embodiment, time interval 34 is an idle mode DRX or eDRX interval. According to a further embodiment, time interval 34 (e.g., idle mode DRX interval or eDRX interval) is from 1.28 seconds to 10 seconds. According to this embodiment, although the specific paging information is received in a few milliseconds, the total activity time of user communication device 2, 10 is significantly longer. It may be, for example, 30 to 40 milliseconds longer. Further, according to an embodiment, user communication device 2, 10 is configured to demodulate each paging event.

In general, if communication device 2, 10, 12 has small amounts of data (e.g., smaller than or equal a threshold), communication device 2, 10, 12 may initiate the corresponding small data transmission activity at any point of time. Here, communication device 2, 10, 12 has to take into account, for example, allocated random access procedure resources and/or time slots. However, if communication device 2, 10, 12 initiates a small (packet) data transmission at the start of a pre-determined activity such as paging occasion, a significant overlap in activity time with the predetermined activity such as paging occasion exists. In this way, the aggregated energy consumption is reduced.

In view of the aforesaid, the idea is to divide transmissions of small data amounts into sub-transmissions and to execute each sub-transmission time aligned with the pre-determined activity such as paging. The general concept of this idea is illustrated in FIG. 4.

Figure 4:
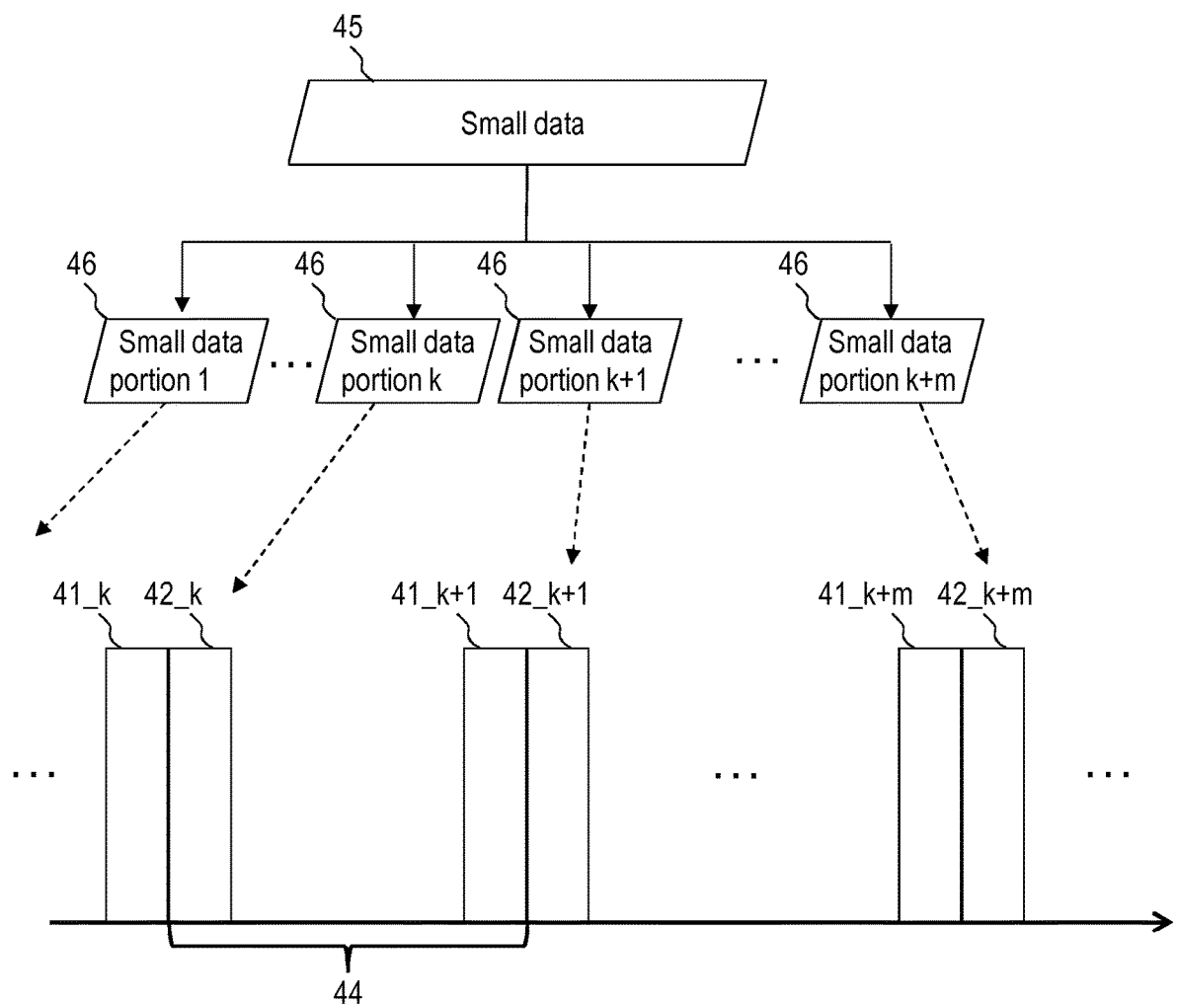
FIG. 4 shows a transmission of data that is executed time aligned with a pre-determined activity according to an embodiment of the present invention.

FIG. 4 shows a transmission of small data (i.e. of data, size of which is smaller than or equal a threshold) that is executed time aligned with a pre-determined activity (e.g., paging activity, radio channel measurement activity, tracking area update activity, routing area update activity, synchronization activity, location area update activity, pilot signal transmission activity, etc.) according to an embodiment of the present invention. According to the embodiment of FIG. 4, a communication device 2, 10, 12 divides small data 45 to be transmitted into at least one small data portions or packets 46. According to FIG. 4, a plurality of small data portions or packets 46 is obtained. The dividing of small data 45 into small data portions or packets 46 is executed such that each small data portion or packet 46 has a size that is smaller than or equal a maximum small data portion or packet size. According to an embodiment, small data portions or packets 46 have essentially the same size (e.g., the maximum small data portion or packet size).

Subsequently, communication device 2, 10, 12 transmits each of the small data portions or packets 46 at a corresponding time pre-determined for the execution of the pre-determined activity. For example, in a first step 41_$k$, 41_$k$+1, ..., 41_$k$+m ($m≥0$ and being a natural), communication device 2, 10, 12 executes activities for preparing the execution of the pre-determined activity as described above. In a second step 42_$k$, 42_$k$+1, ..., 42_$k$+m, the pre-determined activity is started and executed by the communication device 2, 10, 12. Within the second or paging step 42_$k$, 42_$k$+1, ..., 42_$k$+m, the communication device 2, 10, 12 is arranged to communicate data and/or signals (if available) as described above, wherein said communicating is a part of the pre-determined activity. Additionally, the communication device transmits, within the second or paging step 42_$k$, 42_$k$+1, ..., 42_$k$+m, also a corresponding small data portion or packet 46 time aligned with the pre-determined activity. Time aligned with the pre-determined activity means that the communication device 2, 10, 12 is active with regard to the time, pre-determined for the execution of the pre-determined activity, but does not execute any communication that is a part of the pre-determined activity at the time of the transmission of the corresponding small data portion or packet 46. Thus, a time slot within the pre-determined time is used that is free for communication (e.g., transmission and/or reception) purposes and that can be used for transmitting a small data portion or packet 46.

According to the idea as shown in FIG. 4, a delay tolerant transmission is partitioned or sub-divided to occur time aligned when communication activity is anyway awaited. For example, if transmission time for each small data portion 46 is 50 milliseconds, the total required transmission of small data 45 is j*50 milliseconds, wherein j is the number of data portions 46, in which small data 45 has been subdivided. If the wakeup time is 10 milliseconds, the transition to active state is 10 milliseconds, the time for paging reception and paging post-processing is 20 milliseconds, and the transmission time for each small data portion 46 is 50 milliseconds, the total required active time for the transmission of all data portions 46 of a small data 45 is j*(10+10+50) milliseconds, i.e. j*70 milliseconds. The total time required for executing paging and small data transmission separately, in turn, is j*(10+20)+10+10+j*50 milliseconds, i.e. j*80+20 milliseconds. Thus, a small data transmission time aligned with a pre-determined activity provides a time saving of j*10+20 milliseconds. When taking j as a concrete number, average time saving is approximately 20%.

Figure 5:
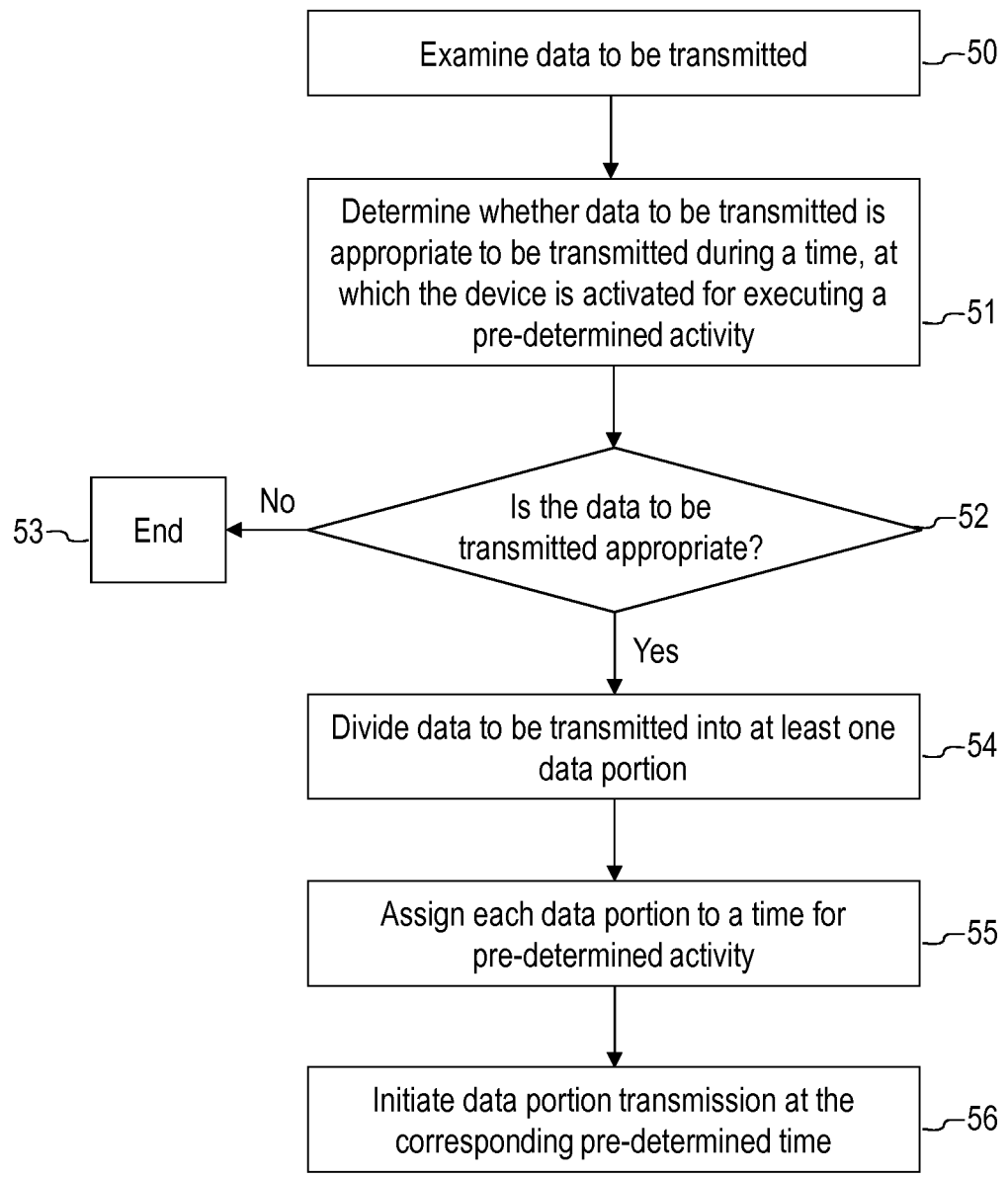
FIG. 5 shows a flowchart with steps executed with regard to a data transmission according to an embodiment of the present invention.

FIG. 5 shows a flowchart with steps executed with regard to a data transmission according to an embodiment of the present invention. Steps shown in FIG. 5 are executed by a communication device 2, 10, 12.

In step 50, data to be transmitted is examined. According to an embodiment, data to be transmitted is taken from transmission buffer 24 of communication device 2, 10, 12. The examination step 50 comprises at least one of two sub-steps.

According to a first sub-step, a data size examination is executed. In particular, a size of data to be transmitted is determined. The data size is determined, for example, in bits, bytes, kilobytes, megabytes etc. In the first sub-step, it is examined whether the data size of the data to be transmitted is smaller than or equal a data size threshold.

According to a second sub-step, a data portion number examination is executed. In particular, a number of data portions 46 is determined that would be obtained by dividing data to be transmitted in data portions 46. In the second sub-step, it is examined whether the number of data portions 46 is smaller than or equal a data portion number threshold.

According to an embodiment, one of the two sub-steps is executed. According to another embodiment, both sub-steps are executed.

In step 51, it is determined whether data to be transmitted is appropriate to be transmitted during a time, at which the device is activated for executing a pre-determined activity. According to the present embodiment, the determining 51 is executed in view of the result of the examination step 50. The result depends on whether one or both of the sub-steps of the examination step 50 have been executed or on whether results of one or both of the sub-steps of the examination step 50 have to be taken into consideration.

Generally, if, in the first sub-step, it is determined that the data size of the data to be transmitted is smaller than or equal a data size threshold, the data to be transmitted may be or is considered as being appropriate.

Similarly, if, in the second sub-step, it is determined that the number of data portions 46 is smaller than or equal a data portion number threshold, the data to be transmitted may be or is considered as being appropriate.

If both of the two sub-steps of the examination step 50 have to be taken into consideration and if both sub-steps have been executed, results of both sub-steps have to indicate that the data to be transmitted may be or is considered as being appropriate. Only in this case the result of the determination 51 will indicate that the data to be transmitted is appropriate to be transmitted during a time, at which the device is activated for executing a pre-determined activity. I.e. the result of the determination 51 will indicate that the data to be transmitted is small data.

If any one of the two sub-steps of the examination step 50 has to be taken into consideration or if a particular sub-step of the two sub-steps of the examination step 50 has to be taken into consideration, the corresponding sub-step has to indicate that the data to be transmitted may be or is considered as being appropriate. Only in this case the result of the determination 51 will indicate that the data to be transmitted is appropriate to be transmitted during a time, at which the device is activated for executing a pre-determined activity. I.e. the result of the determination 51 will indicate that the data to be transmitted is small data.

In step 52, it is determined whether or not the data to be transmitted is appropriate to be transmitted during a time, at which the device is activated for executing a pre-determined activity, i.e. whether or not the data to be transmitted is small data. Here, the result of step 51 is used.

If the data to be transmitted is not appropriate, no small data that is small enough to be transmitted time aligned with the pre-determined activity is given. Thus, a conventional data transmission, i.e. a data transmission as generally executed by communication device 2, 10, 12 is performed. In particular, the data is transmitted during a data transmission time that is different from the time pre-determined for the execution of the pre-determined activity. In FIG. 5 it is indicated by an end step 53 because a data transmission as generally done by communication device 2, 10, 12 will be executed with regard to said data.

If the data to be transmitted is appropriate, i.e. if data that is small enough to be transmitted time aligned with the pre-determined activity is given. In response to this determination, it is turned to step 54 in which data to be transmitted, i.e. small data is divided into at least one data portion or packet 46. As described above, division 54 of small data 45 into small data portions or packets 46 is executed such that each small data portion or packet 46 has a size that is smaller than or equal a maximum small data portion or packet size. According to an embodiment, small data portions or packets 46 have essentially the same size (e.g., the maximum small data portion or packet size).

In step 55, each data portion 46 is assigned to a time that is pre-determined for executing the pre-determined activity. The time may be predetermined, for example, in view of a given scheduling or in view of a given communication (i.e. transmission and/or reception) scheduling in general. Because, the pre-determined activity is a repetitive task, each data portion 46 is assigned to a corresponding time, pre-determined for execution of the pre-determined activity. According to an embodiment, each data portion 46 is assigned to a time slot within the corresponding pre-determined time.

In step 56, transmission of a data portion 46 is initiated at, i.e. executed during the corresponding pre-determined time. If a particular time slot has been determined, the initiation, i.e. the execution of the transmission of data portion 46 is done at, i.e. during said time slot. Thus, two different data portions 46 of small data 45 are transmitted 56 during two different pre-determined times.

The execution of steps 55 and 56 can be executed also substantially or partially in parallel for different data portions 46, wherein for each data portion 46, at first, step 55 and, subsequently, step 56 is executed.

Further, according to an embodiment, the execution of the data transmission time aligned with the pre-determined activity is to be activated with regard to a communication device 2, 10, 12. This allows a targeted use of the data transmission that is time aligned with the pre-determined activity. For example, operators of communication networks 11 or users of user communication devices 2, 12 receive the possibility of influencing data transmission processes. The activation can be executed in different ways. According to an embodiment, an explicit activation is executed. Here, communication device 2, 10, 12 receives at least one of the following: a signal, an indicator, a flag, a signalling bit etc., indicating whether or not communication device 2, 10, 12 is activated for data transmission that is time aligned with the pre-determined activity. According to another embodiment, an implicit activation is executed. In this case, a communication protocol of communication network 11, for example, specifies whether or not communication device 2, 10, 12 is permitted to execute the data transmission that is time aligned with the pre-determined activity. According to a further embodiment, the execution of the data transmission that is time aligned with the pre-determined activity can be activated, i.e. permitted for communication devices 2, 10, 12 of a particular, e.g., pre-set category, for communication devices 2, 10, 12 executing particular, e.g., pre-set functions, for communication devices 2, 10, 12 meeting a particular, e.g., pre-set, quality of service (QoS) level (e.g., having a QoS class identifier (QCI)), and/or for transmissions of certain maximum sizes etc. Here, several different criteria may be used.

Thus, according to the embodiment, communication device 2, 10, 12 determines whether or not it is activated, i.e. permitted to execute data transmission time aligned with the pre-determined activity before starting the execution of step 51 of FIG. 5.

Further, according to an embodiment of the present invention, the maximum data size that is used for dividing small data 45 to be transmitted into data portions or packets 46 is determined by communication device 1, 10, 12. According to an embodiment, the determination is executed by a standardized signalling. I.e. communication device 2, 10, 12 receives a signal or information indicating the maximum size of a data portion or packet 46. According to another embodiment, communication device 2, 10, 12 selects the maximum size from a standardized table or determines the maximum size according to a maximum size calculation method. Here, several different calculation methods can be implemented. In particular, the calculation methods can be based on parameters such as utilized DRX interval, mobility of user communication device 2, 10, communication device's 2, 10, 12 transmit power class, and/or communication device's 2, 10, 12 average signal quality. In the following, an exemplary calculation method is considered in more detail.

Figure 6:
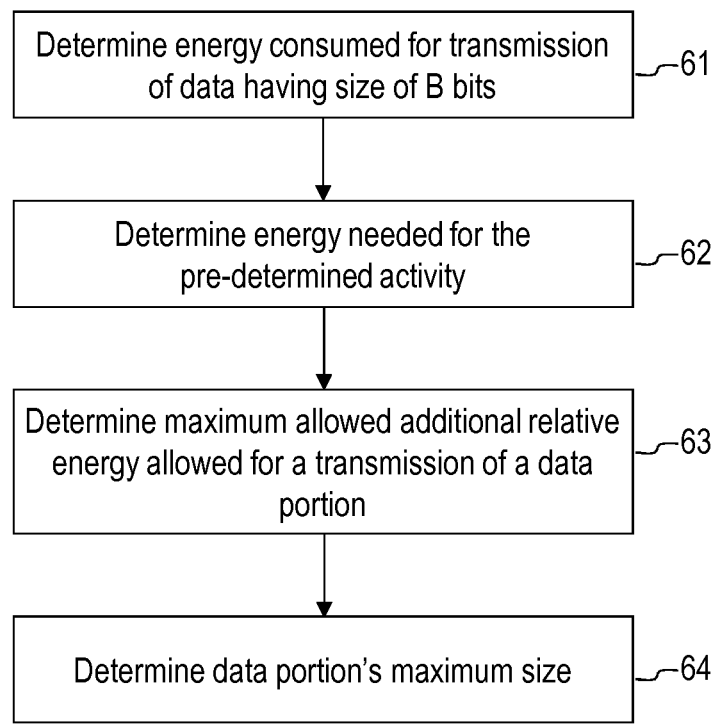
FIG. 6 shows a flowchart with steps executed for determining of a maximum size of a data portion according to an embodiment of the present invention.

FIG. 6 shows a flowchart with steps executed for determining of a maximum size of a data portion according to an embodiment of the present invention. According to the embodiment of FIG. 6, in step 61, an estimate of energy E1 consumed for a transmission of data having a size of "B" bits is determined or estimated, said data transmission being executed time aligned with a pre-determined activity. "B" may correspond to (e.g., be equal or smaller than) the threshold used in step 52 for determining whether the data to be transmitted is small data. For the estimation or determination of energy E1, time T1 is estimated or determined in seconds that are required for a transmission connection setup and release. Further, an average data throughput Tp, which is expected for a data transmission over a wireless interface, is estimated or determined in bits/seconds. This estimation or determination can be captured or detected, for example, from a look-up table or based on a collection of historical data statistics on data throughputs of previous data transmissions. Furthermore, an average current I1_1 and I1_2 consumed to setup and release a connection I1_1 and to be active for a transmission in the wireless network I1_2 respectively is estimated or determined. After the execution of each of the estimations and/or determinations, the estimate of energy E1 is calculated as follows:

$$E1 = T1 \cdot I1\_1 + B/Tp \cdot I1\_2.$$

In step 62, an estimate of energy E2 needed for the data and/or signal communication of the pre-determined activity event is estimated or determined. For this purpose, a time T2 in seconds is estimated or determined that would be required to perform the data and/or signal communication. Further, an average current I2 that is required to conduct the data and/or signal communication is estimated or determined. Subsequently, the estimate of energy E2 is calculated as follows:

$$E2 = T2 \cdot I2.$$

In step 63, a maximum allowed additional relative energy k allowed for a transmission of a data portion or packet 46 is determined. According to an embodiment, this relative additional energy factor is pre-defined in a look-up table. If a modem is used for data transmission, the look-up table may be defined by the modem vendor.

In step 64, a ratio of E2 and E1, i.e. k=E2/E1 is calculated. Subsequently, the maximum size of a data portion or packet 46, i.e. of amount of data to be transmitted time aligned with the pre-determined activity is determined in step 64 as B:

$$B = (Tp \cdot T2 \cdot I2 - Tp \cdot k \cdot T1 \cdot I1\_1)/(k \cdot I1\_2)$$

Any of the above-mentioned estimations of T1, Tp, I1_1, I1_2, T2, I2 can be captured or derived from a look-up table or can be determined based on corresponding collection(s) of historical data observed or monitored with regard to previous data transmission. If a modem is used for data communication (i.e. data transmission and/or reception), look-up table(s) pre-defined by modem vendor are used according to an embodiment. Look-up values can be different in different look-up tables based on, e.g., utilized radio access technology, average signal strength, and/or other radio related parameters.

Further, according to an embodiment, with regard to the maximum size, an abbreviation range is provided. In this case, the determined maximum size can have abbreviations upwards and/or downwards. The abbreviation range can be provided also as a percentage. Also the abbreviation percentage or the abbreviation range may be provided in a look-up table.

Recently, in 3rd generation partnership project (3GPP) radio access network (RAN), a proposal with regard to signalling reduction to enable light connection for LTE has been made. According to an embodiment of the present invention, a light connection (e.g., as proposed or used for LTE) is used by a user communication device 2, 10 for scheduling or executing transmissions of data portions 46 during paging events being an example of the pre-determined activity of the present invention. Thus, if a user communication device 2, 10 has a certain amount of data 45 to be transmitted (e.g., in transmission buffer 24), said data 45, if smaller than the threshold, is divided into sub-transmissions, i.e. data portions 46 and is transmitted during paging times by use of the light connection. According to an embodiment, the light connection has different operation modes.

According to an embodiment, complete radio resource control (RRC) connected mode parameters, utilized conventionally for decreasing power consumption, can be saved when transmitting small data 45 time aligned with paging events. In this way, a user communication device 2, 10 may consider itself as being in a full connected mode, but use idle mode DRX interval 44 for small data 45, i.e. data portion 46 transmissions. Subsequently, after a small data 45 transmission, a medium user equipment (UE) context saving mode can be used by user communication device 2, 10.

Thus, by the above-presented technique, due to presence of paging events, mandatory activity periods in a user communication device 2, 10 are used to coordinate transmissions of small data 45 into these periods. Since data 45 of some services or applications might be larger than the maximum size of a data portion or packet 46, the transmission connection used for a transmission of a data portion 46 can be maintained for a further transmission of a further data portion 46, the transmission is then continued at a further paging time, i.e. with regard to a further paging event. If LTE network is used as communication network 13, the light connection of LTE can be used for data portion 46 transmission.

Although the invention has been shown and described with respect to certain preferred embodiments, equivalents and modifications will occur to others skilled in the art upon the reading and understanding of the specification. The present invention includes all such equivalents and modifications, and is limited only by the scope of the following claims.

The invention claimed is:

1. A communication device comprising:
a processor; and
a memory device storing instructions thereon that when executed by the processor cause the communication device to:
  divide data to be transmitted into multiple data portions; and
  at a start of a time at which the communication device is to be activated for executing pre-determined activity after being in an idle mode:
    transmit at least one of the multiple data portions; and/or
    initiate transmission of the remaining ones of the multiple data portions,
wherein the pre-determined activity comprises a data communication in an interval having a repetitive pattern,
wherein the initiating the transmission of the remaining ones of the multiple data portions references a radio resources control (RRC) connected mode activity of the communication device for the transmission of the remaining ones of the multiple data portions in the RRC connected mode activity,
wherein the RRC connection mode activity is different from the pre-determined activity,
wherein the processor executing the instructions causes the communication device to transmit the at least one of the multiple data portions and/or initiate the transmission of the remaining ones of the multiple data portions within the interval having the repetitive pattern,
wherein each data portion has a size that is equal to or smaller than a maximum size,
wherein the communication device is configured to determine the maximum size by use of at least one of:
  a time required for connection setup for data communication and/or a time required for connection release;
  an average data throughput expected for a data transmission;
  an average current consumption consumed with regard to connection setup for data communication, operating in an active state, and/or connection release;
  a time required for the communicating of data;
  an average current consumed for the communicating data; and/or
  a received signal or received information indicating the maximum size.

2. The communication device according to claim 1, wherein the communication device is configured to:
execute an examination of said data to be transmitted; and/or
determine whether the data to be transmitted is appropriate to be transmitted during the time at which the communication device is to be activated for executing the pre-determined activity.

3. The communication device according to claim 2, wherein:
said examination comprises:
  a data size examination, in which the communication device is configured to examine whether the data to be transmitted has a data size that is smaller than or equal a data size threshold; and/or
  a data portion number examination, in which the communication device is configured to examine whether a number of the data portions that would be obtained when dividing the data to be transmitted into at least one portion is smaller than or equal a data portion number threshold; and/or
the communication device is configured to determine that the data to be transmitted is appropriate to be transmitted during the time, at which the communication device is activated for executing the pre-determined activity if:
  the data size of the data to be transmitted is smaller than or equal the data size threshold; and/or
  the number of the data portions that would be obtained when dividing the data to be transmitted into at least one portion is smaller than or equal the data portion number threshold.

4. The communication device according to claim 2, wherein:
the communication device is configured to divide the data to be transmitted into multiple data portions and to transmit each data portion if the data to be transmitted is appropriate to be transmitted during the time at which the communication device is to be activated after being in the idle mode for executing the pre-determined activity and/or
the communication device is configured to execute the examination of the data to be transmitted for each entry of a transmission buffer.

5. The communication device according to claim 1, wherein the communication device is configured to:
initiate the transmission of each data portion at a time at which the communication device itself is expecting to execute the pre-determined activity; and/or
execute a transmitting of each data portion during a time at which the communication device is executing parts of the pre-determined activity or the whole pre-determined activity.

6. The communication device according to claim 1, wherein:
the communication device is configured to transmit each data portion via a light connection.

7. The communication device according to claim 1, wherein:
the communication device is configured to, based on whether at least two data portions are obtained by dividing the data to be transmitted into at least one data portion:
maintain a connection established and/or used for a transmission of a first data portion of the at least two data portions; and
re-use said connecting for a transmission of a further data portion of the at least two data portions.

8. The communication device according to claim 1, wherein the pre-determined activity comprises at least one of:
a paging activity;
a radio channel measurement activity;
a tracking area update activity;
a routing area update activity;

a synchronization activity;
a location area update activity;
a pilot signal transmission activity;
a pilot signal reception activity;
a device-to-device discovery signal reception;
a device-to-device discovery signal transmission;
a system information transmission activity; and/or a system information reception activity.

9. The communication device according to claim 1, wherein the processor executing the instructions causes the communication device to transmit the at least one of the multiple data portions and initiate the transmission the remaining ones of the multiple data portions at a start time of a paging window within an extended discontinuous reception eDRX period.

10. A method comprising:
dividing data to be transmitted into multiple data portions; and
at a start of a time at which a communication device is to be activated for executing a pre-determined activity after being in an idle mode:
transmitting a one of the multiple data portions; and/or
initiating transmission of the remaining ones of the multiple data portions,
wherein the pre-determined activity comprises a data communication in an interval having a repetitive pattern,
wherein the initiating the transmission of the remaining ones of the multiple data portions references a radio resources control (RRC) connection mode activity of the communication device for the transmission of the remaining ones of the multiple data portions in the RRC connected mode activity,
wherein the RRC connection mode activity is different from the pre-determined activity,
wherein the transmitting the at least one of the multiple data portions and/or the initiating the transmission of the remaining ones of the multiple data portions occur within the interval having the repetitive pattern,
wherein the dividing the data comprises dividing the data such that each data portion has a size that is equal to or smaller than a maximum size,
wherein the maximum size is determined based on at least one of:
a time required for connection setup for data communication and/or a time required for connection release;
an average data throughput expected for a data transmission;
an average current consumption consumed with regard to connection setup for data communication, operating in an active state, and/or connection release;
a time required for the communicating of data;
an average current consumed for the communicating data; and/or a received signal or received information indicating the maximum size.

11. The method according to claim 10, further comprising:
examining the data to be transmitted; and/or
determining whether the data to be transmitted is appropriate to be transmitted during the time at which the communication device is to be activated for executing the pre-determined activity.

12. The method according to claim 11:
wherein the examining comprises:
a data size examination, in which the communication device is configured to examine whether the data to be transmitted has a data size that is smaller than or equal a data size threshold; and/or
a data portion number examination, in which the communication device is configured to examine whether a number of the data portions that would be obtained when dividing the data to be transmitted into at least one portion is smaller than or equal a data portion number threshold; and/or
further comprising determining that the data to be transmitted is appropriate to be transmitted during the time at which the communication device is activated for executing the pre-determined activity if:
the data size of the data to be transmitted is smaller than or equal the data size threshold; and/or
the number of the data portions that would be obtained when dividing the data to be transmitted into at least one portion is smaller than or equal the data portion number threshold.

13. The method according to claim 11, wherein:
the dividing and transmitting comprises dividing the data to be transmitted into multiple data portions and transmitting each data portion if the data to be transmitted is appropriate to be transmitted during the time at which the communication device is to be activated after being in the idle mode for executing the pre-determined activity and/or
the examining the data comprises examining the data to be transmitted for each entry of a transmission buffer.

14. The method according to claim 10, further comprising:
initiating the transmission of each data portion at a time at which the communication device itself is expecting to execute the pre-determined activity; and/or
executing a transmitting of each data portion during a time at which the communication device is executing parts of the pre-determined activity or the whole pre-determined activity.

15. The method according to claim 10, wherein:
the transmitting each data portion comprises transmitting each data portion via a light connection.

16. The method according to claim 10, further comprising:
based on whether at least two data portions are obtained by dividing the data to be transmitted into at least one data portion:
maintaining a connection established and/or used for a transmission of a first data portion of the at least two data portions; and
re-using the connecting for a transmission of a further data portion of the at least two data portions.

17. The method according to claim 10, wherein:
the transmitting each data portion comprises:
transmitting each data portion during the time at which the communication device is to be activated after being in the idle mode for executing a pre-determined activity comprising at least one of:
a paging activity;
a radio channel measurement activity;
a tracking area update activity;
a routing area update activity;
a synchronization activity;
a location area update activity;

a pilot signal transmission activity;
a pilot signal reception activity;
a device-to-device discovery signal reception;
a device-to-device discovery signal transmission;
a system information transmission activity; and/or a system information reception activity.

* * * * *